United States Patent [19]
Kubota et al.

[11] Patent Number: 5,499,148
[45] Date of Patent: Mar. 12, 1996

[54] DIGITAL VIDEO TAPE REPRODUCING APPARATUS COMPATIBLE WITH TAPES HAVING A TRACK WIDTH DIFFERENT FROM A ROTARY MAGNETIC HEAD WIDTH

[75] Inventors: Yukio Kubota; Keiji Kanota, both of Kanagawa, Japan

[73] Assignee: Sony Corporation, Tokyo, Japan

[21] Appl. No.: 966,540

[22] Filed: Oct. 23, 1992

[30] Foreign Application Priority Data

Oct. 30, 1991 [JP] Japan ................................ 3-310156

[51] Int. Cl.⁶ .............................................. G11B 15/46
[52] U.S. Cl. ...................... 360/73.06; 360/27; 360/10.3
[58] Field of Search ........................... 360/73.06, 73.12, 360/73.01, 27, 32, 10.1, 33.1, 10.2–10.3; 358/335, 310

[56] References Cited

U.S. PATENT DOCUMENTS

| | | | |
|---|---|---|---|
| 4,307,417 | 12/1981 | Tokyama | 360/10.1 X |
| 4,607,293 | 8/1986 | Okada et al. | 360/21 X |
| 4,703,352 | 10/1987 | Kondo | 358/135 |
| 4,710,811 | 12/1987 | Kondo | 358/135 |
| 4,760,474 | 7/1988 | Takimoto | 360/73.06 X |
| 4,791,497 | 12/1988 | Nakano et al. | 360/48 X |
| 4,803,570 | 2/1989 | Kashida et al. | 360/32 X |
| 4,811,130 | 3/1989 | Takayama | 360/10.3 X |
| 4,827,359 | 5/1989 | Ookawa et al. | 360/10.3 |
| 4,963,961 | 10/1990 | Honjo | 358/310 |
| 5,136,437 | 8/1992 | Tabuchi et al. | 360/34.1 X |
| 5,148,331 | 9/1992 | Kashida et al. | 360/77.15 |

FOREIGN PATENT DOCUMENTS

| | | | |
|---|---|---|---|
| 0026320 | 4/1981 | European Pat. Off. | G11B 5/02 |
| 0152242 | 8/1985 | European Pat. Off. | G11B 5/588 |
| 0376675 | 12/1988 | European Pat. Off. | |
| 146387 | 11/1981 | Japan | 360/33.1 |
| 3-8173 | 1/1991 | Japan. | |

*Primary Examiner*—Andrew L. Sniezek
*Attorney, Agent, or Firm*—William S. Frommer; Alvin Sinderbrand

[57] ABSTRACT

In a digital video tape recording and/or reproducing apparatus including a pair of rotary magnetic heads having a predetermined head width and gaps with mutually different azimuth angles which helically scan a magnetic tape as the tape is advanced in order to reproduce digital video signals that have been previously azimuth-recorded in oblique tracks on the tape, there is a tape transport that can transport the tape either at a standard speed or at a non-standard speed. If the tracks recorded on the video tape have a track width equal to the head width, then the tape is transported for reproduction at the standard speed, whereas, if the track width is different from the head width, the tape is transported at the non-standard speed. For example, if the track width is twice the head width, then the tape is transported at twice the standard speed. On the other hand, in another embodiment, when the track width is half of the head width, the tape is transported at a non-standard speed that is one-half the standard speed.

8 Claims, 7 Drawing Sheets

DIGITAL VIDEO TAPE REPRODUCING APPARATUS COMPATIBLE WITH TAPES HAVING A TRACK WIDTH DIFFERENT FROM A ROTARY MAGNETIC HEAD WIDTH

BACKGROUND OF THE INVENTION

1. Field of the Invention

This invention relates to digital video tape recorders, and more particularly to a video tape recording and/or reproducing apparatus, hereinafter a VTR, that may reproduce a video signal from a magnetic tape using a magnetic head that is different in width from a magnetic head with which the tape was recorded.

2. Description of the Prior Art

A D1 format component-type digital VTR and a D2 format composite-type digital VTR have been developed for use by broadcasting stations in digitizing color video signals and recording the digitized signals on a recording medium, such as a magnetic tape. In the D1 format digital VTR, a luminance signal and first and second color different signals are A/D converted with sampling frequencies of 13.5 MHz and 6.75 MHz, respectively. Thereafter, the signals are suitably processed and then recorded on a magnetic tape. Since the ratio of sampling frequencies of the signal components is 4:2:2, this system is usually referred to as the 4:2:2 system.

On the other hand, in the D2 format video digital VTR, a composite video signal is sampled at a sampling rate that is four times higher than the frequency fsc of a color subcarrier signal and then is A/D converted. Thereafter, the resultant signal is suitably processed and then recorded on a magnetic tape.

Since these known D1 and D2 format digital VTRs are designed for professional use, for example in broadcasting stations, attainment of high picture quality is given top priority in the design and construction of such VTRs, and the weight and size of the apparatus is not overly important.

In these known digital VTRs, the digital color video signal, which results from each sample being A/D converted into, for example, 8 bits, is recorded without being substantially compressed. As an example, in the known D1 format digital VTR which A/D converts each sample into 8 bits with the frequencies noted above, the data rate representing the color video signal is approximately 216 Mbps (megabits per second). When the data in the horizontal and vertical blanking intervals are removed, the number of effective picture elements of the luminance signal per horizontal interval and the number of effective picture elements of each color different signal per horizontal interval become 720 and 360, respectively. Since the number of effective scanning lines for each field in the NTSC system (525/60) is 250, the data bit rate Dv can be expressed as follows:

$$Dv = (720 + 360 + 360) \times 8 \times 250 \times 60 = 172.8 Mbps$$

In the PAL system (625/50), since the number of effective scanning lines for each field is 300 and the number of fields per second is 50, it is apparent that the data bit rate is the same as in the NTSC system.

If redundant data components necessary for error correction and formatting are considered, the total bit rate for the picture data becomes approximately 205.8 Mbpps.

Further, the amount of audio data Da is approximately 12.8 Mbps, while the amount of additional data Do, such as data representing an interblock gap, a preamble, and a postamble used for editing, control and the like, is approximately 6.6 Mbps. Thus the bit rate of all the data to be recorded can be expressed as follows:

$$\begin{aligned} Dt &= Dv + Da + Do \\ &= 205.8 + 12.8 + 6.6 = 225.2 \text{ Mbps} \end{aligned}$$

In order to record this amount of information data, the known D1 format digital VTR employs a segment system having a track pattern made up of ten tracks for each field in the NTSC system, or made up of twelve tracks for each field in the PAL system.

In these digital VTRs, a recording tape having a width of 19 mm is used. There are two types of recording tapes which respectively have thicknesses of 13 μm and 16 μm. To house these tapes, there are three types of cassettes, which are respectively known as large, medium and small sizes. The information data is recorded on such tapes in the D1 format with a tape area for each bit of data of approximately 20.4 μm². When the recording density is increased, errors tend to take place in the playback output data due to interference between codes or non-linearity in the electromagnetic conversion system of the head and tape. Heretofore, even if error correction encoding is used, the above given value of the recording density has been the limit therefor.

Taking the above described parameters into account, the recording capacities of the cassettes having the various sizes and the two tape thicknesses, when employed in the D1 format digital VTR, are as follows:

| Size/Tape Thickness | 13 μm | 16 μm |
| --- | --- | --- |
| small | 13 minutes | 11 minutes |
| middle | 42 minutes | 34 minutes |
| large | 94 minutes | 76 minutes |

It will be noted that the recording capacities of these cassettes are relatively short, the longest being just over 1½ hours. It has accordingly been desired to increase the recording capacity of tape cassettes used for digital video recording by increasing the recording density. One approach to increasing the recording density is to reduce the track width of the recording tracks in which the digital signals are recorded. For example, if the track width were reduced by one-half, e.g. from 10 μm to 5 μm, the recording density, and hence the tape cassette recording capacity, can be doubled. A way of reducing the track width is to use a recording head that has a narrower width. However, use of a narrower head and the resulting recording in narrower tracks, would cause a lack of compatibility between VTRs using different sizes of magnetic heads. That is, tapes recorded on a conventional VTR using a wider head could not readily be reproduced by a VTR using a narrower head, and, conversely, recordings made using a narrower head could not readily be reproduced by conventional, wider head, VTRs.

Further, if it were desired to standardize on a narrower head and track width, it may be that a VTR using the narrow head would perform satisfactorily only if it remained stationary and in a good recording environment and would fail to perform satisfactorily if it were to be transported or used in a location where vibration or other conditions tend to interfere with recording. In such a case, standardization on the narrower widths would not be possible, and a VTR using the wider head, and recording and reproducing wider tracks, would continue to be necessary for non-stationary applications with a resulting problem of compatibility as described above.

Alternatively, standardizing on a wider track and head width of 10 μm would prevent the desired increase in recording density and recording capacity.

OBJECTS AND SUMMARY OF THE INVENTION

Accordingly, it is an object of this invention to permit use of VTRs having recording heads of different widths, while overcoming compatibility problems by providing a VTR that can reproduce video signals recorded on a magnetic tape in tracks that have a width different from the width of the VTR's magnetic reproducing heads.

In accordance with an aspect of the present invention, a digital video tape recording and/or reproducing apparatus, or VTR includes a pair of rotary magnetic heads which have a predetermined head width and mutually different azimuth angles and which helically scan a magnetic tape as the tape is advanced to reproduce digital video signals azimuth-recorded in oblique tracks on the tape, a tape drive for driving the tape at a tape transport speed selected from a standard speed and another speed different from the standard speed, and a tape drive control for controlling the tape drive to drive the tape at the standard speed when the oblique tracks have a track width equal to the predetermined head width, and to drive the tape at the other speed when the oblique tracks have a track width different from the predetermined head width.

In one embodiment of this invention, the track width is greater than the head width and the standard speed is less than, for example, one half the other speed.

In another embodiment of the invention, the track width is less than the predetermined head width, and the standard speed is greater than, for example, twice the other speed.

According to another aspect of the invention, in either of the VTRs described above, the magnetic tape has recorded thereon in the oblique tracks an identification signal that is indicative of the track width of the oblique tracks and the tape drive control includes circuitry for detecting and responding to the identification signal.

In accordance with yet another aspect of the invention, a VTR, as aforesaid, further includes tracking control means for causing each of the magnetic heads to simultaneously scan a respective pair of adjacent oblique tracks when the oblique tracks have a track width that is one-half the predetermined head width. In such case, one track of each pair has a direction of magnetization that corresponds to the azimuth angle of the one magnetic head then scanning the pair of tracks and the other track of the pair has a direction of magnetization that does not correspond to the azimuth angle of that head.

According to a further aspect of the invention, a trailing magnetic head simultaneously scans an adjacent pair of the oblique tracks after a leading magnetic head has simultaneously scanned the same adjacent pair of tracks, and the leading and trailing heads have mutually different azimuth angles. The above, and other objects, features and advantages of the present invention, will be more fully understood from the detailed description of preferred embodiments of the present invention when read in conjunction with the accompanying drawings in which corresponding parts are identified by the same reference numerals.

DETAILED DESCRIPTION OF THE PREFERRED EMBODIMENTS

Figure 1:
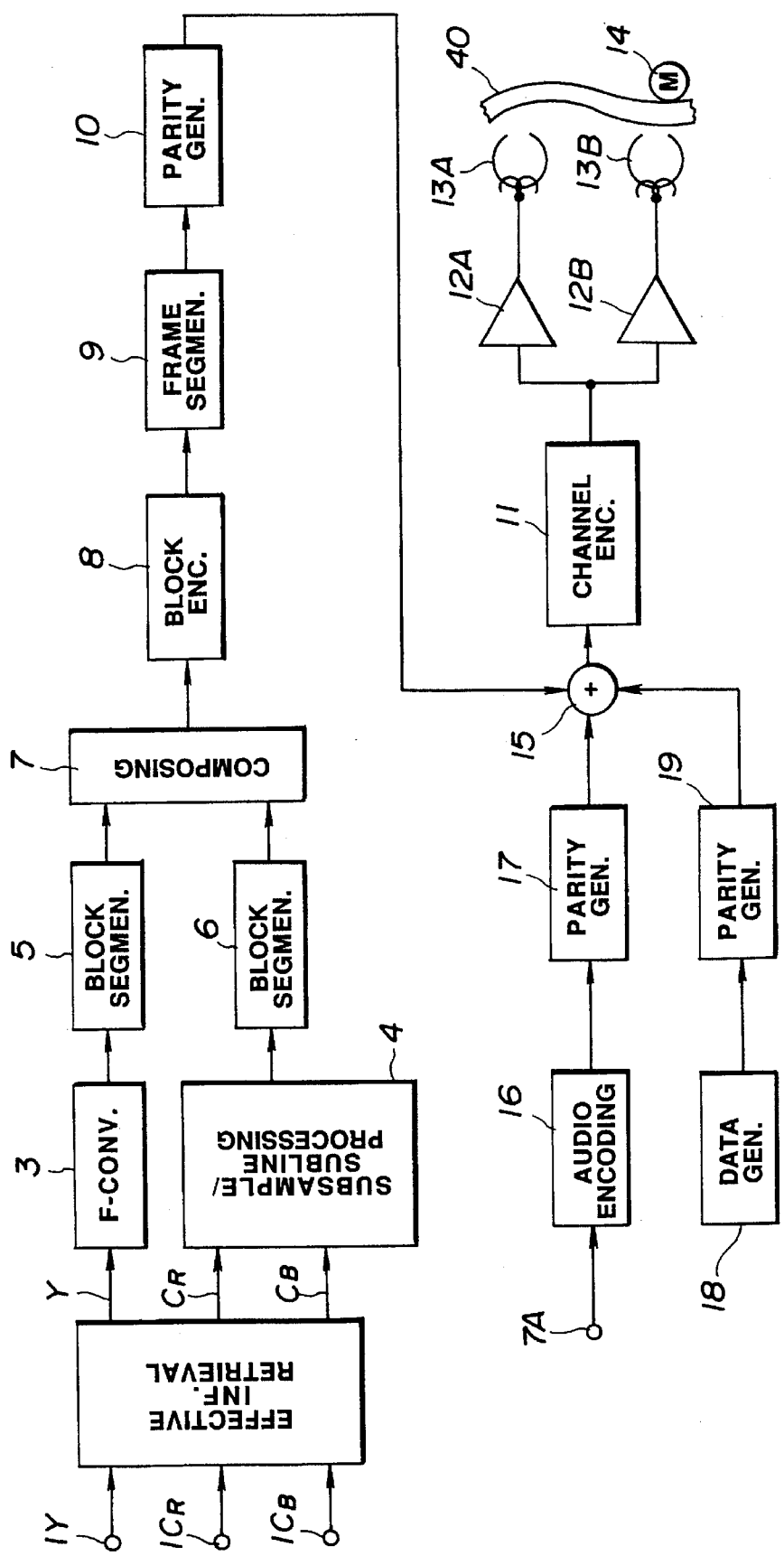
FIG. 1 is a block diagram of the recording circuit of an embodiment of a digital VTR according to the invention.

A signal recording portion of a digital VTR according to an embodiment of the present invention will now be described with reference to FIG. 1. As shown therein, a digital luminance signal Y and digital color difference signals $C_R$ and $C_B$, formed from three primary color signals R, G and B, are respectively supplied to input terminals 1Y, $1C_R$, and $1C_B$. The three primary color signals R, G and B may, for example, be supplied from a color video camera for suitable processing and digitizing in order to provide the input signals as just described. The respective clock rates of the input signals are substantially the same as the frequencies of the component signals of the above-mentioned D1 format digital VTR. In other words, the sampling frequencies for the luminance and color difference signals are 13.5 MHz and 6.75 MHz, respectively. Similarly, the number of bits per sample is also 8 bits. Thus, the amount of data per second which is supplied to the input terminals 1Y, $1C_R$ and $1C_B$ is also approximately 216 Mbps as earlier described. The signals from the input terminals 1Y, $1C_R$ and $1C_B$ are supplied to an effective information retrieval circuit 2 which is adapted to omit or remove data from the received signals during the blanking intervals and to retrieve information only from the effective area. As a result, the data are compressed such that the data rate is reduced to approximately 167 Mbps.

The luminance signal Y from the effective information retrieval circuit 2 is supplied to a frequency conversion circuit 3. The frequency conversion circuit 3 converts the sampling frequency from 13.5 MHz into a frequency which is three-fourths of 13.5 MHz. The frequency conversion circuit 3 may include a thin-out filter so as to prevent reflected distortion from occurring. The output signal of the frequency conversion circuit 3 is supplied to a block segmentation circuit 5. The block segmentation circuit 5 converts the received scanning sequence luminance data into a block sequence.

Figure 3:
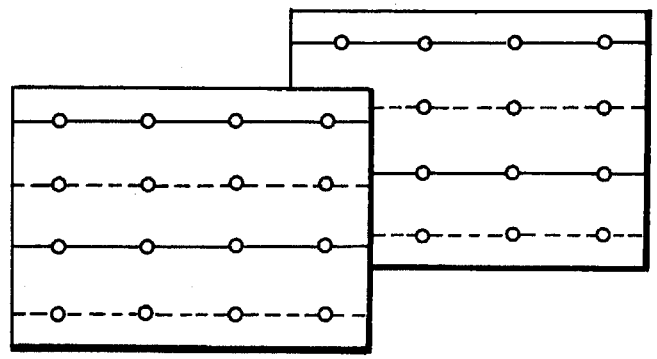
FIG. 3 is a schematic diagram to which reference will be made in describing block encoding.

FIG. 3 is a schematic diagram illustrating a three-dimensional arrangement of blocks which may be used by the block segmentation circuit 5 as an encoding unit. More specifically, by dividing a screen which may occupy, for example, two frames as shown in FIG. 3, a large number of unit blocks (4 lines×4 picture elements×2 frames) are formed. In FIG. 3, the solid lines represent lines associated with odd fields, while the broken lines represent lines associated with even fields.

Returning to FIG. 1, it will be seen that the two color difference signals $C_R$ and $C_B$ from the effective information retrieval circuit 2 are supplied to a sub-sampling and sub-line processing circuit 4. The sub-sampling and sub-line processing circuit 4 converts the sampling frequency from 6.75 MHz into a frequency which is one-half of 6.75 MHz and then alternatively selects one of the two digital color difference signals for each line. Thereafter, the sub-sampling and sub-line processing circuit 4 composes the two digital color difference signals into one channel of data and outputs a line sequential digital color difference signal.

Figure 4:
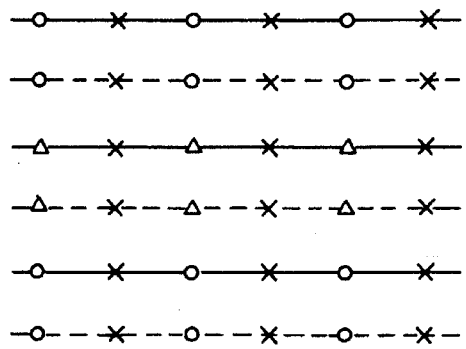
FIG. 4 is a schematic diagram to which reference will be made in describing sub-sampling and sub-line processing.

FIG. 4 shows picture elements of a signal which have been sub-sampled and sub-lined by the circuit 4. In FIG. 4, "0" represents a sampling picture element of the first color difference signal $C_R$; "Δ" represents a sampling picture element of the second color difference signal $C_B$; and "X" represents a position in which a picture element has been thinned out by the sampling processing.

The line sequential signal from the sub-sampling and sub-line processing circuit 4 is supplied to a block segmentation circuit 6. In a manner similar to the block segmentation circuit 5, the block segmentation circuit 6 converts scanning sequence color difference data into a block sequence data arrangement having a relatively large number of unit blocks, in which each block may be, for example, 4 lines×4 picture elements×2 frames. The output signals of the block segmentation circuits 5 and 6 are supplied to a composing circuit 7.

The composing circuit 7 converts the received luminance signal and the color difference signal which have been converted into respective block sequence signals into one channel of data. The output signal of the composing circuit 7 is supplied to a block encoding circuit 8. Block encoding circuit 8 may, for example, apply adaptive dynamic range coding (ADRC) or may perform a discrete cosine transform in order to compression-code the data blocks supplied thereto.

If ADRC is used, the block encoding circuit 8 may comprise an encoder similar to that disclosed in Japanese Patent Appln. Nos. SHO 59-266407 and SHO 59-269866, which have a common assignee herewith. Such an ADRC encoder generally detects the maximum value and the minimum value of data representing a plurality of picture elements contained in each block and then calculates a dynamic range of the block from the detected maximum and minimum values. Thereafter, the ADRC encoder encodes the data in accordance with the dynamic range such that the data are re-quantized so as to have a lesser number of bits than those of the original picture element data.

Alternatively, the block encoding circuit may include a discrete cosine transform circuit in which the picture element data of each block are subjected to discrete cosine transform (DCT) processing and the coefficient data obtained by the DCT processing are quantized. DCT processing makes use of correlation that is usually present among pixels in a given block so that the coefficient data may be quantized using fewer bits than were used in the original data. Further compression may be achieved by using run-length or Huffman encoding.

The output signal of block encoding circuit 8 is supplied to a frame segmentation circuit 9. The frame segmentation circuit 9 converts the received signal into data in a frame arrangement and converts a picture system data clock into a record system clock.

The output signal of the frame segmentation circuit 9 is supplied to a parity generation circuit 10 which generates an error correction code parity signal. The output signal of the parity generation circuit 10 is supplied to a mixing circuit 15.

A digital audio signal is supplied from an input terminal 1A to an audio encoding circuit 16. The audio encoding circuit 16 may, for example, be adapted to compress the received audio signal by differential pulse code modulation (DPCM) processing. The output data of the audio encoding circuit 16 is supplied to a parity generation circuit 17 which generates an error correction code parity signal. The parity signal from parity generation circuit 17 is supplied to the mixing circuit 15.

In addition, data generated from a data generation circuit 18 is supplied to parity generation circuit 19. The data supplied by data generation circuit 18 includes an identification signal which, as will be discussed below, identifies the track width of signal recording tracks that are produced by the recording section of FIG. 1. Data generation circuit 18 may, for example, comprise a microprocessor that controls some or all of the operations of the VTR. It should be noted that data generation circuit 18 may provide data in addition to the track width identification signal.

Parity generation circuit 19 performs an error correction encoding process on the data received from data generation circuit 18 and generates a parity signal, which is supplied to mixing circuit 15. Mixing circuit 15 is adapted to combine the received parity signals from the parity generation circuits 10, 17 and 19 such that picture data, audio data and additional data are arranged in a predetermined pattern. The output signal of mixing circuit 15 is supplied to a channel encoder 11 which performs channel encoding so as to decrease the low band of the data to be recorded. Channel encoder 11 may include, for example, a scrambling circuit, a so-called class 4 partial response pre-coder, and the like. The output signal of the channel encoder 11 is supplied through recording amplifiers 12A and 12B and rotating transformers (not shown) to magnetic heads 13A and 13B, respectively, and is then recorded on magnetic tape 40 by heads 13A and 13B.

As will be understood by those skilled in the art, the signal supplied to amplifiers 12A and 12B advantageously also includes automatic track following (ATF) signals to be recorded on the tape 40 to aid in accurate scanning of the signal tracks by magnetic heads during reproducing. Such signals may comprise, for example, signals of the types disclosed in U.S. Pat. No. 5,095,394 and U.S. application Ser. No. 07/699,322 filed May 13, 1991, which have a common assignee herewith.

Magnetic tape 40 is driven by a motor 14, which, in turn, is controlled by a servo control system (not shown) so that motor 14 runs at a predetermined speed.

In the above-described signal recording section of the digital VTR, as shown in FIG. 1, the input data rate of 216 Mbps is reduced to approximately 167 Mbps by retrieving data only from the effective area. The frequency conversion and sub-sample and sub-line processing as described above further reduce the data rate to approximately 84 Mbps. Compression encoding by block encoder circuit 8 still further reduces the data rate to approximately 25 Mbps.

Thereafter, the addition of further data such as parity signals, audio signals and other data increases the data rate to approximately 31.56 Mbps.

The reproduction section of the digital VTR will now be described with reference to FIG. 2.

Figure 2:
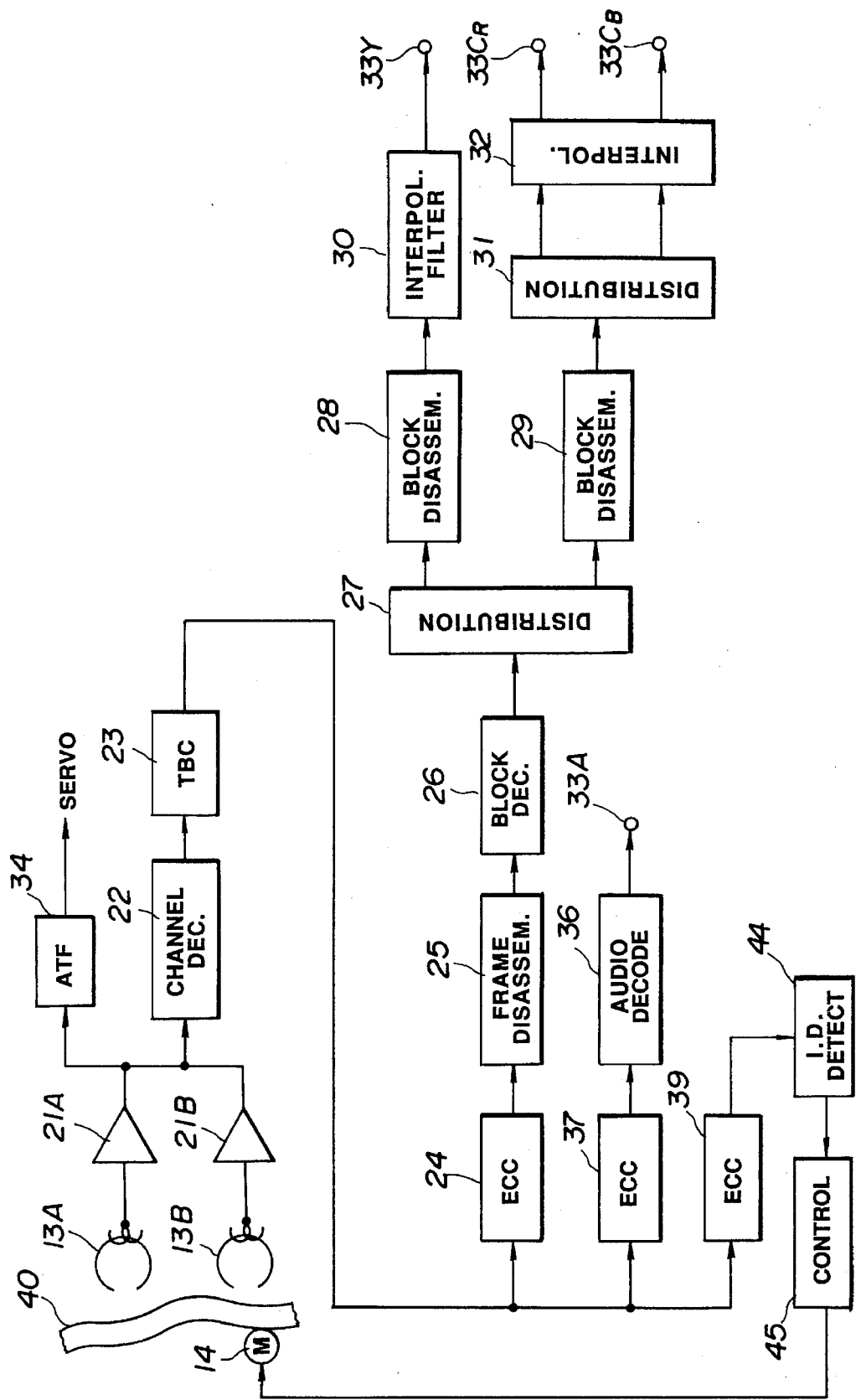
FIG. 2 is a block diagram of the playback circuit of the embodiment of FIG. 1.

As shown in FIG. 2, playback data is obtained from magnetic tape 40 by magnetic heads 13A and 13B and supplied through rotating transformers (not shown) and playback amplifiers 21A and 21B, respectively, to a channel decoder 22. In addition, ATF signals are provided from amplifiers 21A and 21B to ATF circuitry 34 which provides tracking control signals to a servo control system (not shown) in a manner such as those disclosed in the above referenced U.S. Pat. No. 5,095,394 and application Ser. No. 07/699,322.

Channel decoder 22 is adapted to reverse the channel encoding performed by channel encoder 11 and may include, for instance, a Viterbi decoder, a de-scrambler, and the like. Practical arrangements of the channel encoder 11 (FIG. 1) and the channel decoder 22 (FIG. 2) may be as disclosed in Japanese Pat. Appln. No. HEI 1-143,491, which has a common assignee herewith. The output signal of the channel decoder 22 is supplied to a time base correction (TBC) circuit 23 which removes time base errors from the reproduced signal. The reproduced playback from the TBC circuit 23 is supplied to error correction code (ECC) circuits 24, 37 and 39 which correct and modify errors by using a predetermined error correction code. More particularly, the ECC circuit 24 corrects and modifies errors in the picture data, the ECC circuit 37 corrects and modifies errors in the audio data recorded in an audio dedicated area, and the ECC circuit 39 corrects errors in additional data recorded with the picture data and the audio data.

The output signal of the ECC circuit 37 is supplied to an audio decoding circuit 38 which decodes the audio data and outputs a decoded output audio signal to an output terminal 33A.

The output signal of ECC circuit 24 is supplied to a frame disassembling circuit 25. Frame disassembling circuit 25 separates each component of the block encoded picture data and converts the reproducing system clock to a picture system clock. Each data component separated in the frame disassembling circuit 25 is supplied to a block decoding circuit 26. The block decoding circuit 26 decodes the received data in accordance with the original data of each block and supplies the decoded data to a distribution circuit 27. The distribution circuit 27 separates a luminance signal and color difference signal from the received decoded data which are supplied to block disassembling circuits 28 and 29, respectively. The block disassembling circuits 28 and 29 function in a substantially opposite manner to that of block segmentation circuits 5 and 6 of FIG. 1. More specifically, the block disassembling circuits 28 and 29 convert the received block sequence signals into raster scanning sequence signals.

The decoded luminance signal from the block disassembling circuit 28 is supplied to an interpolation filter 30 which converts the sampling rate of the luminance signal from 3 fs to 4 fs (4 FS=13.5 MHz), by interpolating the data. The digital luminance signal Y from the interpolation filter 30 is supplied to an output terminal 33Y.

On the other hand, the digital color difference signal from the block disassembling circuit 29 is supplied to a distribution circuit 31. The distribution circuit 31 separates digital color difference signals $C_R$ and $C_B$ from the line sequential digital color difference signal. The separated digital color difference signals $C_R$ and $C_B$ are supplied from the distribution circuit 31 to an interpolation circuit 32. The interpolation circuit 32 interpolates the received decoded picture element data to obtain the line and picture element data which had been previously thinned out by the circuit 4 of FIG. 1. The interpolation circuit 32 supplies digital color difference signals $C_R$ and $C_B$, each having a sampling rate of 4 fs, to output terminals $33C_R$ and $33C_B$, respectively.

The output signal of ECC circuit 39 is supplied to an I.D. detection circuit 44 which detects a track width identification signal previously recorded and now reproduced from magnetic tape 40. The track width identification signal is indicative of the width of oblique tracks that have been formed on the magnetic tape.

I.D. detection circuit 44 provides to a control circuit 45 a signal that reflects the detected track width identification signal. Control circuit 45 controls the running speed of motor 14, and thereby the transport speed of magnetic tape 40, so that the transport speed of magnetic tape 40 can be selected in dependence upon the width of the tracks on magnetic tape 40.

Control circuit 45 may comprise, for example, a microprocessor that handles servo-control, track following, or other operations of the VTR.

It is to be noted that data in addition to the track width identification signal may be output by ECC circuit 39 to other components (not shown) of the VTR.

Figure 12:
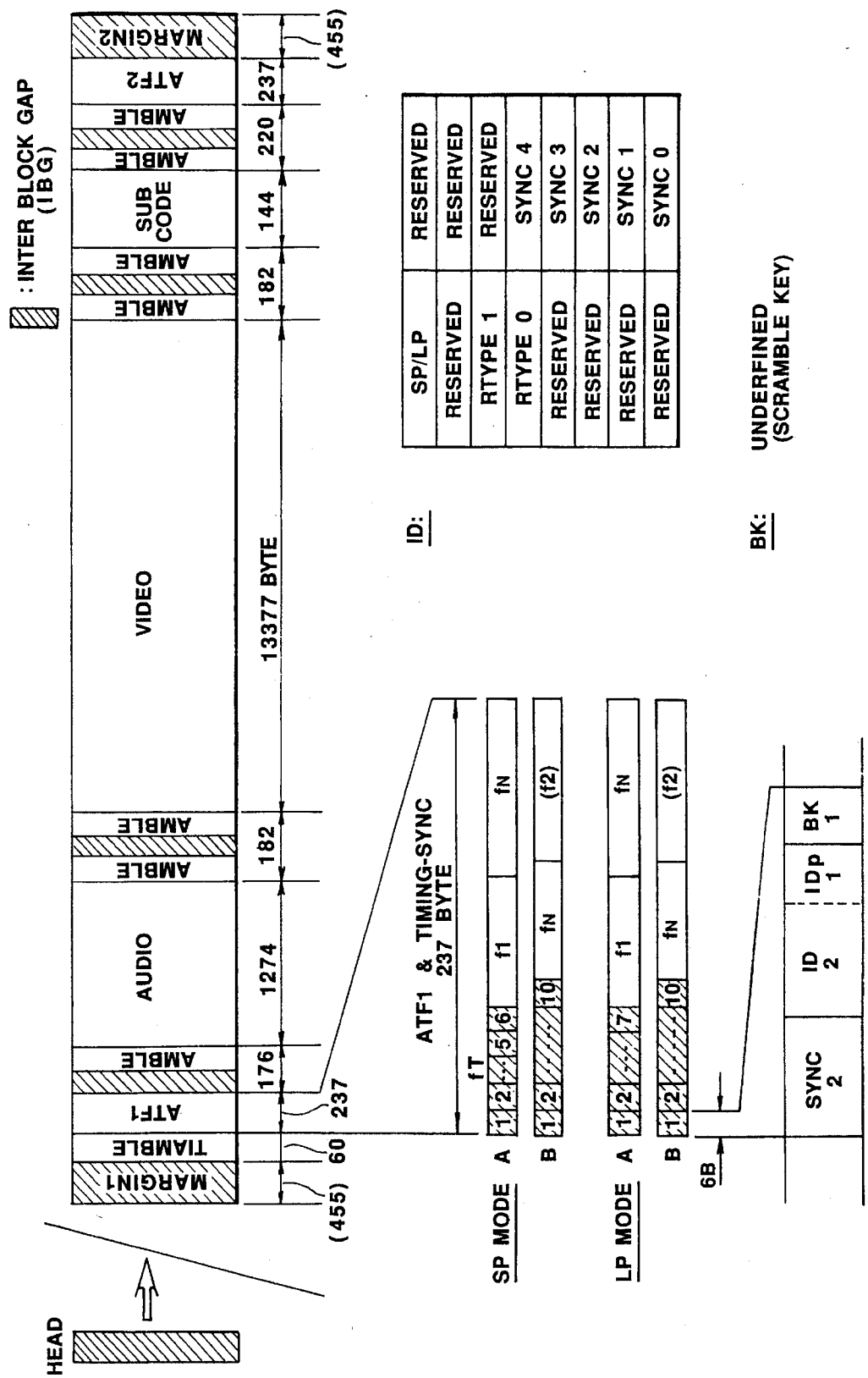
FIG. 12 schematically shows a sequence of signal recording areas arranged along a record track.

Referring now to FIG. 12, a recording track format as recorded by the recording section shown in FIG. 1 and to be reproduced by the reproducing section of FIG. 2, will be discussed. As schematically shown in FIG. 12, the recording track includes (proceeding sequentially in the head scanning direction from the beginning of the track) a first starting margin area; a track preamble area; an area for recording ATF signals, timing and synchronization signals and additional data; an interblock gap; an audio preamble section; an audio data recording section; and an audio postamble section.

An interblock gap follows the audio postamble section and is in turn followed by a video preamble section. There next follows the video data recording section; a video postamble section; an interblock gap; a sub-code preamble section; a sub-code data recording section; a sub-code postamble section; and an interblock gap. Following the last mentioned interblock gap is another preamble section and then a second ATF recording section. After the second ATF recording section is a final margin.

The track width identification signal produced by data generator 18 of FIG. 1, as previously mentioned, may, for example, be recorded in one or more of ID bits or bytes that are part of the first ATF recording section or in the sub-code data recording section.

Figure 5:
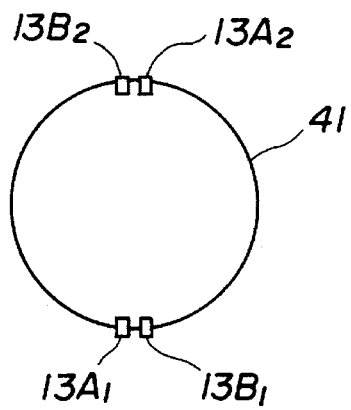
FIG. 5 is a schematic diagram illustrating recording and reproducing head locations.

As shown in FIG. 5, a first pair of heads $13A_1$ and $13B_1$ and a second pair of heads $13A_2$ and $13B_2$ are disposed on a rotary drum 41 so that the respective pairs are diametrically opposed to each other with an angular distance of 180° therebetween. A magnetic tape 40 (not shown in FIG. 5) is obliquely wound on the circumferential surface of rotary drum 41 at a winding angle that is, for example, slightly greater than 180° or, alternatively, slightly less than 180°. Accordingly, both heads of a respective pair of heads scan the magnetic tape at the same time for recording or reproduction of data. Each pair of heads preferably is formed of a unitary structure and each of the heads of the pair has a mutually different azimuth angle as in the so-called double azimuth head arrangement.

Figure 6:
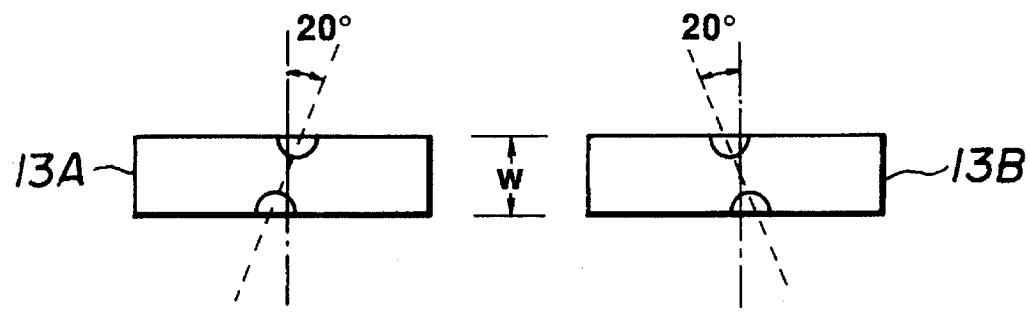
FIG. 6 is a schematic diagram illustrating the different azimuths of the recording and reproducing heads.
Figure 7:
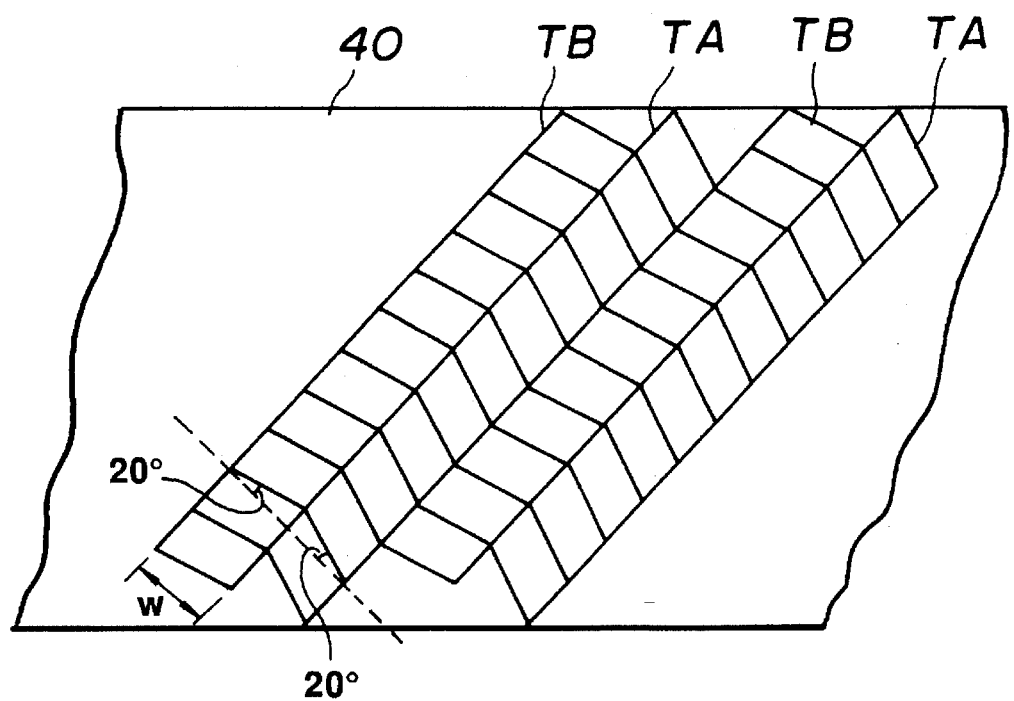
FIG. 7 is a schematic diagram of a record pattern formed by the heads with different azimuths.

Referring now to FIG. 6, it will be seen that head 13A has an azimuth angle of, for example, +20° while the polarity of the azimuth angle of head 13B is reversed, i.e., head 13B has an azimuth angle of −20°. Moreover, it will be seen that both of heads 13A and 13B have a width W. In one embodiment of the digital VTR of the present invention, intended for application in stationary locations where favorable recording conditions prevail, W is equal to 5 μm. Alternatively, in another embodiment intended to be portable or mounted in a vehicle, or otherwise to be used in poor recording conditions, the head width W is twice as large, i.e. 10 μm. By reason of the difference in the azimuth angles, a recording pattern is formed on the magnetic tape, as shown in FIG. 7, in which adjacent tracks TA and TB on the magnetic tape are formed by the respective magnetic heads 13A and 13B, which have different azimuth angles. It will be noted that tracks TA have a direction of magnetization that corresponds to the azimuth angle of magnetic head 13A and tracks TB have a direction of magnetization that corresponds to the azimuth angle of magnetic head 13B. Thus, when the magnetic tape is played back or reproduced, the amount of cross talk between adjacent tracks is decreased due to azimuth loss or attenuation.

It will also be noted from FIG. 7 that each of the tracks has a track width W which corresponds to the head width W of heads 13A and 13B used to record the tracks. Accordingly, if the head width W is 10 μm, the track width W of tracks TA and TB also will be 10 μm. Similarly, if the head width W of heads 13A and 13B is 5 μm, the track width W of tracks TA and TB also will be 5 μm.

Figure 8A:
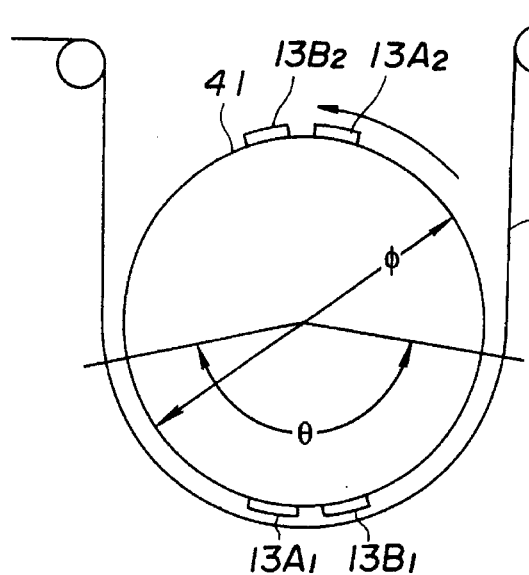
FIGS. 8A and 8B are a top view and side view, respectively, showing the wrapping of a magnetic tape about a head drum assembly in a digital VTR according to this invention.
Figure 8B:
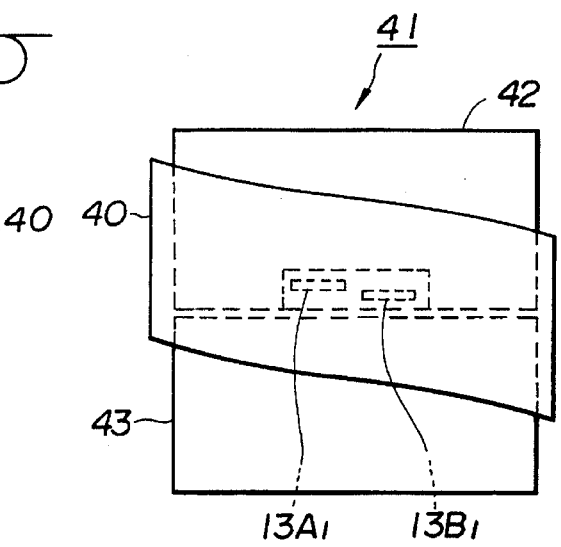

FIGS. 8A and 8B show a practical arrangement in which magnetic heads $13A_1$ and $13B_1$, forming a first pair of magnetic heads, and magnetic heads $13A_2$ and $13B_2$ forming a second pair of magnetic heads are provided in respective unified structures making up each pair and thus providing two so-called double azimuth heads arranged in diametrically opposed positions on drum assembly 41. By way of example, drum assembly 41 includes an upper drum 42 on which all of the heads are mounted and which rotates at a high speed of 150 rps for the NTSC system, while a lower drum 43 is fixed. Magnetic tape 40 is obliquely wound on drum assembly 41 at a winding angle θ of, for example, 166°. Tape 40 is advanced, subject to servo control, in such a manner that, for example, six tracks are scanned by the heads within the time required to record the data for, e.g., one field. Both heads $13A_1$ and $13B_1$ or $13A_2$ and $13B_2$ of a respective pair of heads simultaneously scan the tape for recording of data or reproducing of data, as the case may be. It is also to be noted that the diameter φ of the above-described drums 42 and 43 is for example, 21 mm.

There will now be described reproduction of a video signal from a magnetic tape 40 on which tracks TA and TB have been recorded with a track width W that is different from the width of tracks formed by the magnetic heads 13A, 13B.

Figure 9:
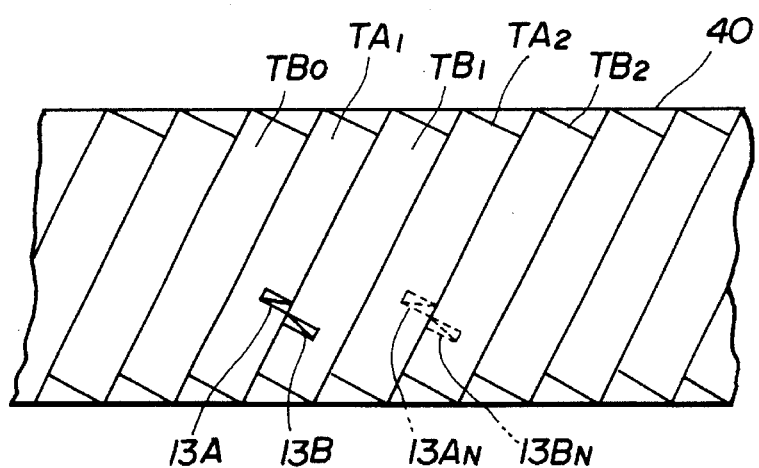
FIG. 9 is a schematic illustration of the scanning relationship between relatively narrow magnetic heads and relatively wide record tracks.

Let it first be assumed that the digital VTR is of the type intended to be used in stationary applications and accordingly is provided with magnetic heads $13A_1$, $13B_1$, $13A_2$ and $13B_2$ (hereinafter simply referred to as magnetic heads 13A, 13B) which have a head width of 5 μm. When such a "stationary" VTR is to reproduce a video signal from a magnetic tape on which a digital video signal has been recorded by a "portable" VTR using heads having a head width of 10 μm, it will be appreciated that the tracks of the signal to be reproduced are wider than the heads 13A, 13B of the "stationary" VTR. As shown in FIG. 9, tracks TA, TB have a width that is twice as great as the head width of the magnetic heads 13A, 13B.

Accordingly, in the "stationary" VTR, the motor 14 of FIG. 2, which was previously referred to, is controlled so that the tape transport speed of magnetic tape 40 is twice as great as the standard tape transport speed used while reproducing signals from a tape recorded by heads 13A and 13B. It will be appreciated that the direction of magnetization of the tracks TA correspond to the azimuth angle of head 13A while the direction of magnetization of the tracks TB correspond to the azimuth angle of head 13B. Using ATF signals as previously referred to, the tracking of heads 13A and 13B is controlled so that head 13A scans the longitudinal half of track $TA_1$ which adjoins track $TB_1$, while head 13B scans the longitudinal half of track $TB_1$ which adjoins track $TA_1$. Referring again to FIG. 2, it is to be noted that ID detection circuit 44 detects a track width ID signal that had been recorded on magnetic tape 40 and provides an appropriate signal to control circuit 45, which in turn controls motor 14 so that tape 40 is advanced at the required non-standard speed that is twice the standard reproduction transport speed.

Accordingly, referring again to FIG. 9, the next scan of a head 13A (shown in phantom and denoted by reference numeral $13A_N$) will be of the rightward longitudinal half (i.e., the half adjoining track $TB_2$) of track $TA_2$, while the next scan of a respective head 13B (shown in phantom and denoted by reference numeral $13B_N$) will be of the leftward longitudinal half (i.e., the half adjoining track $TA_2$) of track $TB_2$.

Figure 10:
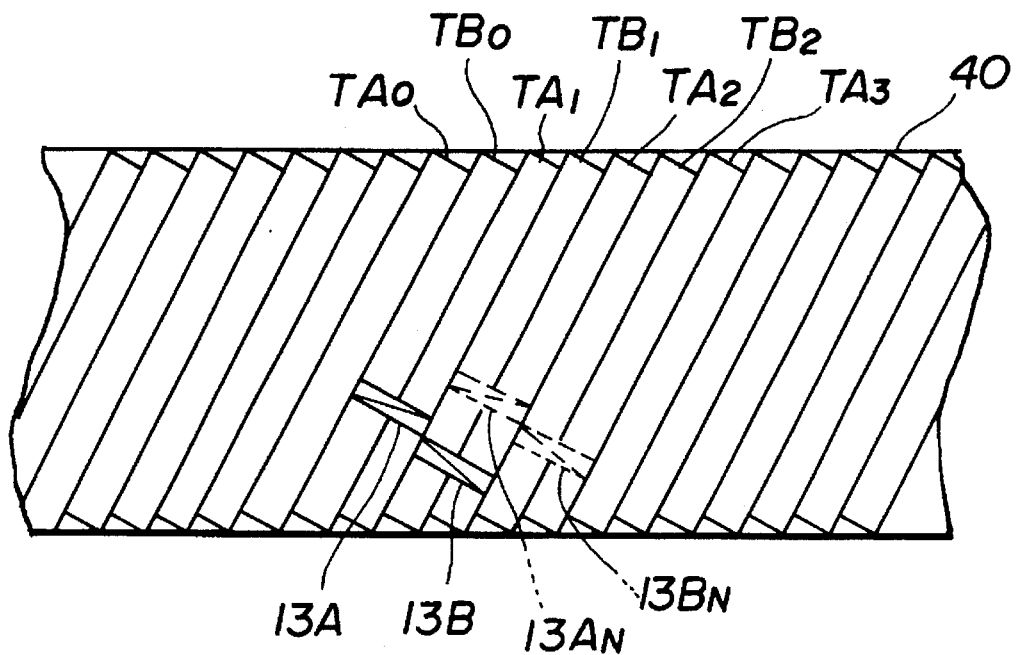
FIG. 10 is a schematic illustration showing the scanning relationship between relatively wide heads and relatively narrow record tracks.

Let it now be assumed that the digital VTR is of the "portable" type and so is provided with magnetic heads 13A, 13B which have a head width of 10 μm. When the "portable" VTR is to reproduce a video signal that has been recorded on a magnetic tape by a "stationary" VTR provided with heads that have a head width of 5 μm, it will be understood that the recorded signal tracks have a track width that is one-half of the head width of the magnetic heads 13A, 13B of the "portable" VTR. Accordingly, as shown in FIG. 10, head 13A simultaneously scans a track $TB_0$ and a track $TA_1$. However, since the direction of magnetization of track $TB_0$ does not correspond to the azimuth angle of head 13A, azimuth loss causes the signal reproduced by head 13A from track $TB_0$ to be sufficiently small that it does not significantly interfere with the signal reproduced by head 13A from track $TA_1$.

At the same time, head 13B simultaneously scans tracks $TB_1$ and $TA_2$. Again, track $TA_2$ has a direction of magnetization that does not correspond to the azimuth angle of head 13B so that the signal reproduced by head 13B from track $TA_2$ is sufficiently small that it does not significantly interfere with the signal reproduced by head 13B from track $TB_1$. Thus head 13A is able to reproduce the signals recorded in track $TA_1$ while head 13B is able to reproduce the signals recorded in $TB_1$.

Moreover, tape 40 is advanced at a non-standard transport speed that is one-half of the transport speed used for reproduction of signals from wide tracks produced by wide heads 13A and 13B. As a result, the next scan by a head 13A (shown in phantom and denoted by reference numeral $13A_N$) will be of tracks $TB_1$ and $TA_2$ together while the next scan of a head 13B (shown in phantom and denoted by reference numeral $13B_N$) will be of tracks $TB_2$ and $TA_3$ together.

It will be recognized that head 13B may be considered a "leading head" and head $13A_N$ a "trailing head" that simultaneously scans adjacent tracks $TB_1$, $TA_2$ after head 13B has done so.

As was the case with the example described with reference to FIG. 9, ID detection circuit 44 (FIG. 2) detects a track width ID signal that was previously recorded on magnetic tape 40 and provides an appropriate signal to control circuit 45, which in turn controls motor 14 so that magnetic tape 40 is transported at the required non-standard (i.e., one-half standard) transport speed.

It should be noted that provision of the "stationary" and "portable" digital VTRs in accordance with the present invention and respectively having 5 μm wide and 10 μm wide magnetic recording heads, allows for "bi-directional" compatibility of the magnetic tapes recorded by the respective digital VTRs. That is, tapes recorded using a 5 μm wide magnetic head can be reproduced by a VTR in accordance with the invention that has a 10 μm wide magnetic head, while tapes recorded by the latter type of VTR can be reproduced by the former type of VTR which has a 5 μm wide head. It will also be noted that a "stationary" VTR of the type described above which has a 5 μm wide head, is able to reproduce video tapes recorded on a conventional digital VTR having 10 μm wide heads so that "backward" compatibility with such conventional digital VTRs is achieved. Accordingly, the goal of greater recording density and recording capacity can be achieved using a narrower recording head, without loss of compatibility with VTRs using a wider recording head.

Figure 11:
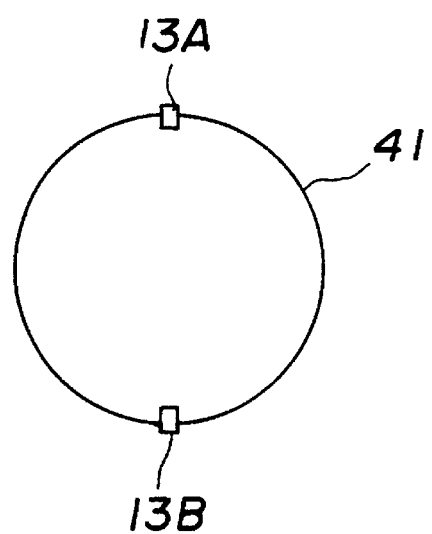
FIG. 11 is a schematic diagram illustrating an alternative arrangement of recording and reproducing heads on a head drum assembly.

It is to be noted that the present invention is not limited to the above-described embodiment, but also can be applied, for example, to a digital VTR in which only two magnetic heads 13A and 13B are mounted, in diametrically opposed positions, on a rotary drum 41, as shown in FIG. 11. It will be understood that the heads 13A and 13B of FIG. 11 have mutually different azimuth angles.

It should also be understood that the present invention can also be embodied in "reproduce-only" equipment, i.e., in apparatus which has only reproducing, and no recording, electronics.

Having described the illustrative embodiments of the invention with reference to the accompanying drawings, it is to be understood that the invention is not limited thereto, and that various changes and modifications can be effected therein by one skilled in the art without departing from the scope or spirit of the invention as defined in the appended claims.

What is claimed is:

1. A digital video tape reproducing or recording and reproducing apparatus including at least one pair of rotary magnetic heads having a predetermined head width and gaps with mutually different azimuth angles and which helically scan a magnetic tape as said tape is advanced to reproduce digital video signals azimuth-recorded in oblique tracks on said tape, all of the rotary magnetic heads of said apparatus having the same predetermined width, said magnetic tape having an identification signal recorded in said oblique tracks thereon which is indicative of a track width of said oblique tracks, said apparatus comprising:

tape drive means for driving said tape at a tape transport speed selected from a standard speed and another speed that is faster than said standard speed; and tape drive control means having means for detecting said identification signal recorded in said oblique tracks of said magnetic tape for controlling said tape drive means to drive said tape at said standard speed when said oblique tracks have a track width equal to said predetermined head width, and to drive said tape at said other speed when said oblique tracks have a track width wider than said predetermined width.

2. An apparatus according to claim 1; wherein said standard speed is one-half said other speed.

3. An apparatus according to claim 1; wherein said apparatus is a recording and reproducing apparatus; and further comprising:

recording means for forming oblique recording tracks on a magnetic tape by azimuth recording digital video signals on said magnetic tape by use of said magnetic heads, said tracks formed by said recording means having a track width equal to said predetermined head width; and identification signal means for generating said identification signal indicative of said track width of said tracks formed by said recording means, said recording means receiving said identification signal and recording the same in said oblique recording tracks formed by said recording means.

4. A digital video tape recording and reproducing apparatus including a plurality of rotary magnetic heads which helically scan a magnetic tape as said tape is advanced to reproduce digital video signals azimuth-recorded in oblique tracks on said tape, all of the rotary magnetic heads of said apparatus having the same head width, said magnetic tape having an identification signal recorded in said oblique tracks thereon which is indicative of a track width of said obliquo tracks, said rotary magnetic heads being arranged as at least one pair of heads having gaps with mutually different azimuth angles and said heads of each pair being mounted so as to simultaneously scan respective adjacent oblique tracks on said tape, said apparatus being selectively operable to reproduce tapes on which said oblique tracks have a wider width or a narrower width, said apparatus comprising:

tape drive means for driving said tape at a tape transport speed selected from a standard speed and another speed that is different from said standard speed;

tape drive control means having means for detecting said identification signal recorded in said oblique tracks of said magnetic tape for controlling said tape drive means to drive said tape at said standard speed when said oblique tracks on said tape have a first one of said wider and narrower widths, and to drive said tape at said other speed when said oblique tracks have a second one of said wider and narrower widths; and means for simultaneously reproducing both tracks of a pair of said oblique tracks by means of respective ones of said rotary magnetic heads when said tape is advanced at said standard speed and when said tape is advanced at said other speed.

5. A digital video tape recording and reproducing apparatus according to claim 4; wherein said head width of said magnetic heads corresponds to said narrower width of said oblique tracks, said standard speed is slower than said other speed, and said narrower width is said first one of said wider and narrower widths.

6. A digital video tape recording and reproducing apparatus according to claim 5; wherein said standard speed is one-half said other speed and said narrower width is one-half said wider width.

7. A digital video tape recording and reproducing apparatus according to claim 5; wherein said head width of said magnetic heads corresponds to said wider width of said oblique tracks, said standard speed is faster than said other speed, and said wider width is said first one of said wider and narrower widths.

8. A digital video tape recorder according to claim 7; wherein said standard speed is twice said other speed and said narrower width is one-half said wider width.

* * * * *